(12) United States Patent
Saib

(10) Patent No.: US 6,456,779 B1
(45) Date of Patent: Sep. 24, 2002

(54) METHOD AND APPARATUS FOR PROVIDING A VIDEO EDITOR

(75) Inventor: Joseph Saib, Englewood, CO (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 08/961,655

(22) Filed: Oct. 31, 1997

(51) Int. Cl.$^7$ ................................................ H04N 5/76
(52) U.S. Cl. .......................................... 386/52; 386/64
(58) Field of Search ................... 386/4, 52, 55, 386/64; 345/328, 723–726; 360/13; 369/83; 395/155

(56) References Cited

U.S. PATENT DOCUMENTS

| | | | | |
|---|---|---|---|---|
| 4,974,111 A | * | 11/1990 | Platte et al. | 386/52 |
| 5,218,672 A | * | 6/1993 | Morgan et al. | 386/55 |
| 5,485,568 A | * | 1/1996 | Venable et al. | 395/155 |
| 5,781,188 A | * | 7/1998 | Amiot et al. | 345/328 |
| 5,999,173 A | * | 12/1999 | Ubillos | 345/328 |
| 6,229,544 B1 | * | 5/2001 | Cragun | 345/418 |

* cited by examiner

Primary Examiner—Thai Tran
(74) Attorney, Agent, or Firm—Blakely, Sokoloff, Taylor & Zafman LLP

(57) ABSTRACT

An apparatus and method for editing video frames stored on a digital video disk is disclosed. The apparatus includes memory for storing instruction sequences, a processor, and a digital video disk drive. The processor executes instructions stored in the memory. The digital video disk drive stores video frames within video. Stored instructions cause the processor to first retrieve one or more video frames from the video on the digital video disk. Then a selection of an editing parameter for a video frame is made. Finally, the apparatus edits the video frame in accordance with the selected editing parameter.

21 Claims, 8 Drawing Sheets

METHOD AND APPARATUS FOR PROVIDING A VIDEO EDITOR

BACKGROUND OF THE INVENTION

1. Field of the Invention

The present invention relates to digital video recording systems and in particular, to a method and apparatus for editing video images in digital video recording systems.

2. Description of Art Related to the Invention

The process of video post production involves the editing and post processing of recorded video material to provide finished programs. Techniques and facilities for postproduction are highly developed and typically involves the use of sophisticated and specialized studio equipment. Such equipment typically includes dedicated, analog hardware, which is expensive and susceptible to noise.

One recent development in the field of video post production involves the use of a personal computer (PC) program, which facilitates video editing. The use of such a program requires the installation of a hardware interface, in the form of a PC card, into the computer. Video data from a video camera recorder (VCR) is first transferred from the VCR to memory located on the card. The video data is then transferred to the computer, where post production processing is performed. Upon completion of the post production processing, the video data is then transferred back to the VCR via the interface card. Examples of such a PC program and the associated hardware include that marketed by Adobe Systems Inc. of San Jose, Calif., under the trade name "Premier" and that marketed by Miro Computer Products of Germany, under the trade name "Miro Video".

The use of such conventional PC programs present a number of significant disadvantages. First, such a technique of post production processing is inherently slow, because of the need to read the video data from the VCR into the memory of the PC via the interface card. Second, such post production processing involves the use of analog devices, which introduce noise to the video images, thus degrading the image quality of the resulting product.

Moreover, there is a growing demand for entertainment systems working in conjunction with various types of broadcasting systems. One such entertainment system includes a broadcast satellite system; namely, a digital satellite system (DSS). A DSS typically comprises an antenna, an integrated receiver decoder (IRD) and a television receiver (TV). In addition, the DSS includes an analog video cassette recorder (VCR) that receives analog data for recording purposes. Along with the growing demand for such entertainment systems, there is an increased need for a simple method and apparatus of providing video editing, which provides a high quality image.

Accordingly, there is a need in the technology for a video editor that is simple and convenient to use and which provides editing without degrading image quality.

SUMMARY OF THE INVENTION

An apparatus and method for editing at least one video frames stored on a digital video disk is disclosed. The apparatus executes instruction sequences located in a memory in a processor-based system, and comprises a memory for storing instruction sequences by which the processor-based system is processed. The apparatus further comprises a digital video disk configured to store at least one video frame and a processor configured to edit the at least one video frame by executing the stored instruction sequences. The stored instruction sequences include process steps to cause the processor to: (a) retrieve the at least one video frame; (b) receive an instruction to select an adjustment parameter of the at least one video frame; and (c) process the at least one video frame in accordance with said instruction.

BRIEF DESCRIPTION OF THE DRAWINGS

The features and advantages of the present invention will become apparent from the following detailed description in combination with the figures listed below.

DESCRIPTION OF THE PREFERRED EMBODIMENT

The present invention relates to a system and method for editing video frames stored on a digital video disk (DVD). In one embodiment, editing of the video frames is performed using processes supported by a processing system such as a computer. While certain illustrative embodiments are set forth to describe the invention, such embodiments should not be construed as a limitation on the scope of the present invention.

Figure 1:
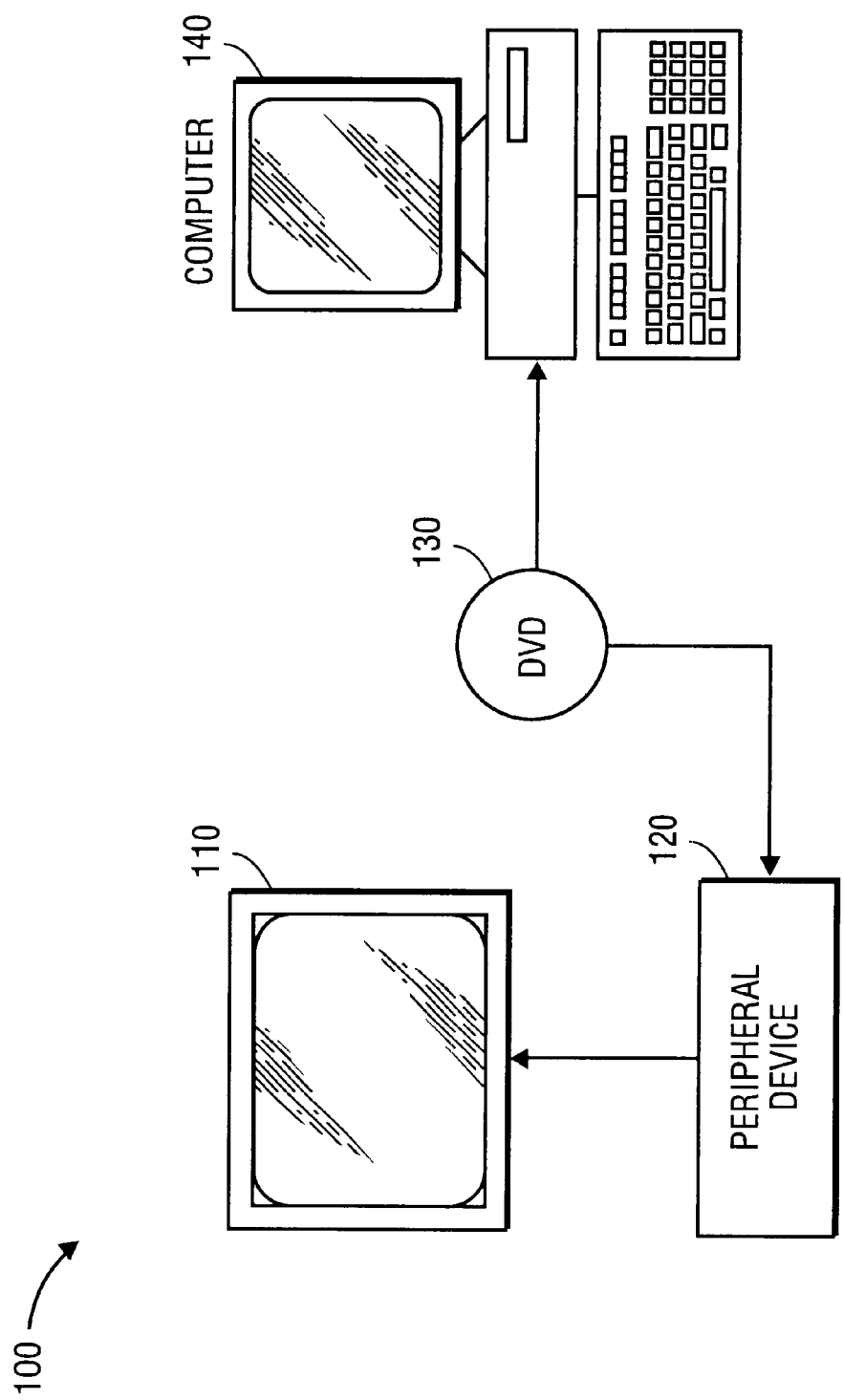
FIG. 1 illustrates one embodiment of an entertainment system which implements the teachings of the present invention.

FIG. 1 illustrates one embodiment of an entertainment system which implements the teachings of the present invention. The entertainment system 100 includes an analog or digital device 110, and/or at least one digital-input peripheral device 120. The device 110 may include, but is not limited or restricted to a standard analog television receiver, a standard digital television receiver or a digital camcorder. The digital-input peripheral device 120 may include, but is not limited or restricted to, a digital video disk (DVD) player, a DVD recorder or a digital camcorder.

The present invention provides an apparatus and method for editing video images or data that is stored on a DVD 130, using a process supported by a processing system 140, such as a personal computer, that has a read and write DVD drive for reading from and writing to the DVD 130. In one embodiment, the DVD 130 is a read and write DVD. One example of such a DVD 130 is the DVD-RAM disk as manufactured by Matsushita Electric industries, Inc. One example of the read and write DVD drive is the DVD-RAM disk drive manufactured by Matsushita Electric Industries, Inc. In one embodiment, the instruction sequences implemented for performing the process may be written using the C++ programming language. In one embodiment, the processing system 140 supports the Microsoft Windows™ programming environment. It is apparent to one of ordinary skill in the art that any other programming language and/or programming environment may be used to implement the principles of the present invention. Once editing is completed, the DVD 130 may be inserted in the peripheral device 120 for viewing.

Figure 2:
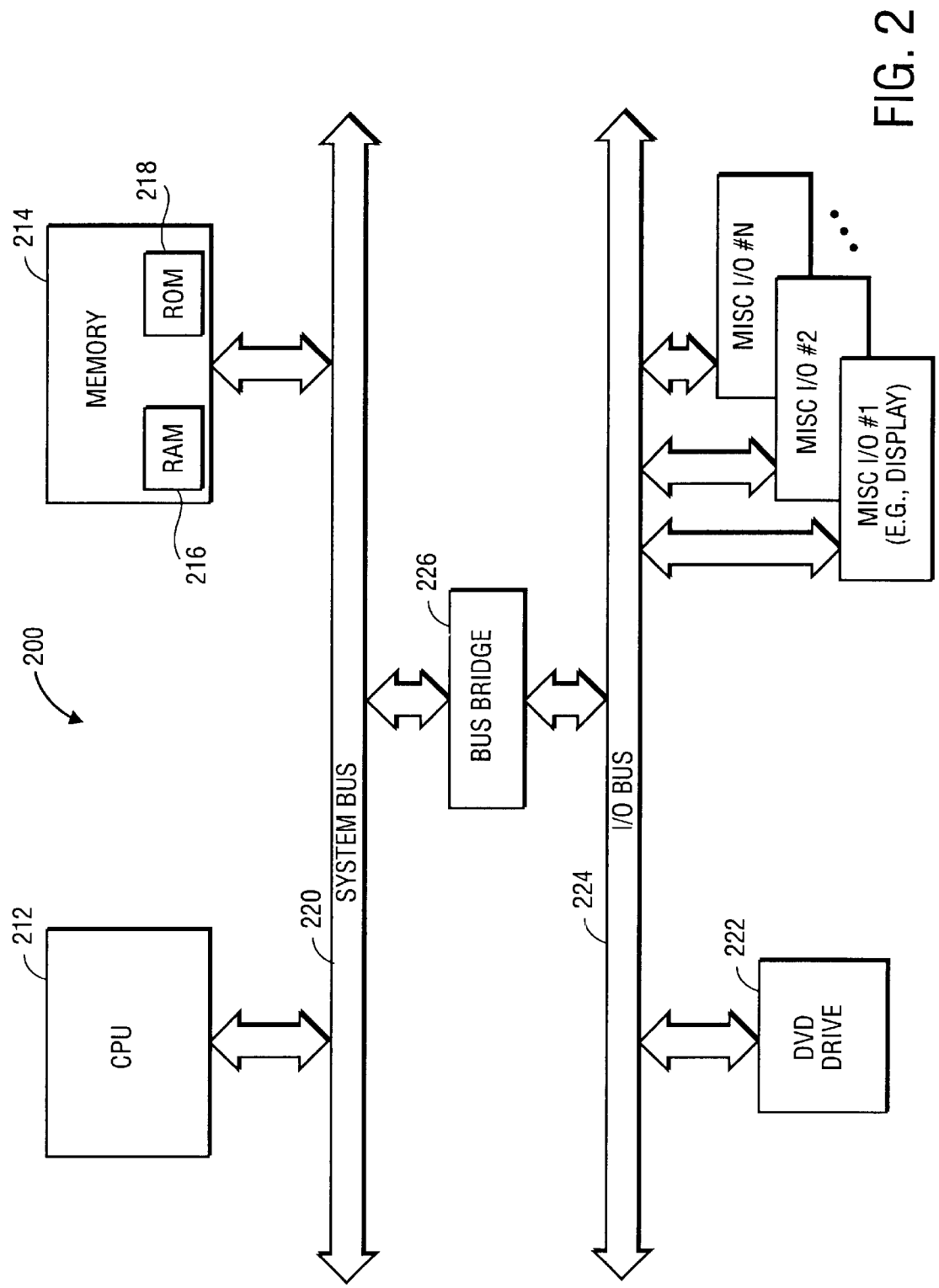
FIG. 2 illustrates an exemplary processing system 200 which implements the processes of the present invention.

The present embodiment is described in reference to a processing system 200 installed on the processor system 140. FIG. 2 illustrates an exemplary processing system 200 which implements the processes of the present invention. The processing system 200 comprises a CPU 212 and a memory module 214. The memory module 214 includes random access memory (RAM) 216 and read-only memory (ROM) 218. In one embodiment, the memory module 214 also includes a main memory or a dynamic random access memory (DRAM). The CPU 212 and memory module 214 are coupled to a system bus 220. The processor system 200 also includes a DVD drive 222 that is coupled along an I/O bus 224. The I/O bus 224 is coupled to the system bus 220 via a bus bridge 226. The processor system 200 may also include various I/O and peripheral modules (MISC I/O #1, #2, . . . #N) which are coupled along the I/O bus 224. Examples of the peripheral modules include a display screen, a keyboard, a printer, and a mouse.

Figure 3:
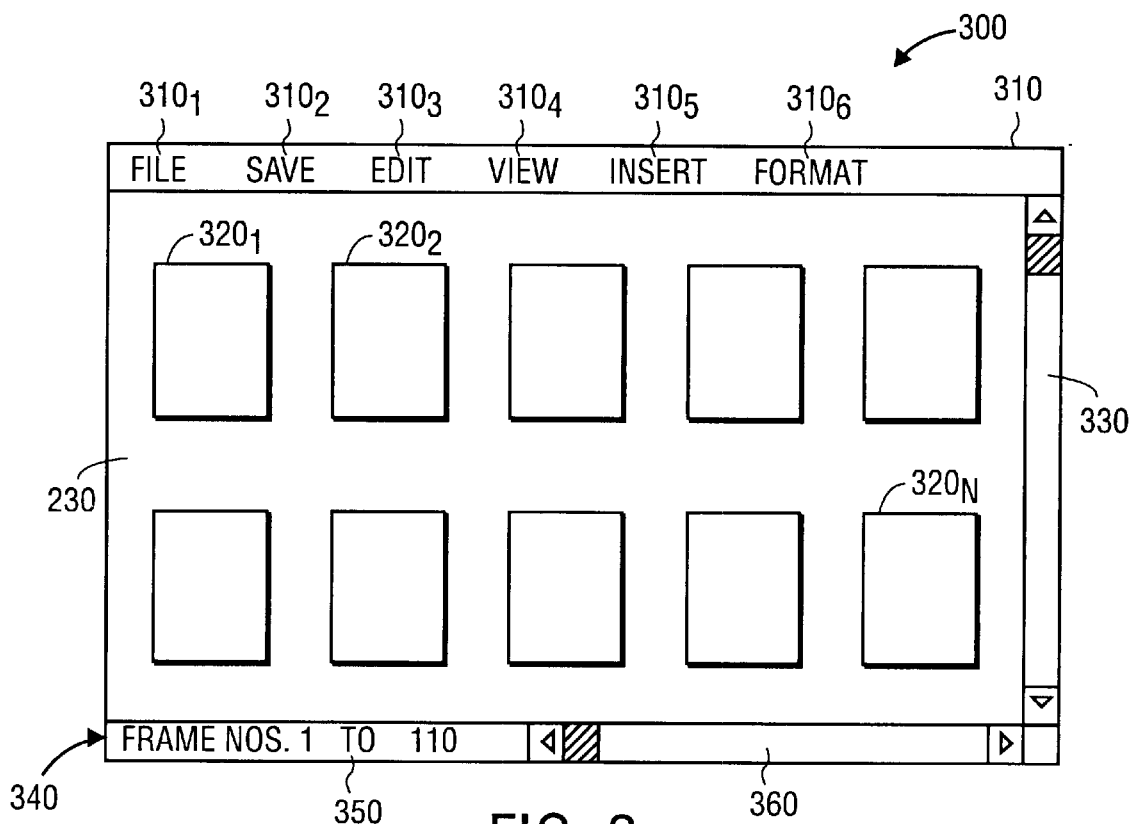
FIG. 3 illustrates one embodiment of a display page with menu items provided for editing video frames, in accordance with the teachings of the present invention.

Upon inserting the DVD disk 130 (FIG. 1) into the DVD drive 222 (FIG. 2) of the processing system 200, the CPU 212 executes instruction sequences stored in memory 214 to display a display page such as that shown in FIG. 3 as display page 300. The display page 300 enables the user to view a plurality of video frames, as well as to edit the video frames and/or provide audio samples corresponding to the video frames. In one embodiment, the display page 300 comprises a header or a banner 310 which displays a plurality of menu items $310_1$–$310_m$, such as file, save, edit, view, insert and/or format. For example, under the "file" menu item $310_1$, the user may elect to open a new file, save an existing file or retrieve an existing file. Under the "save" menu item $310_2$, the user may elect to save the currently displayed file. Under the "edit" menu item $310_3$, the user may elect to cut, paste or otherwise edit text or graphics from the currently displayed video frame(s). Under the "view" menu item $310_4$, the user may elect to view the currently displayed file in a number of formats, such as an enlarged or reduced format. In addition, the user may view one of the plurality of displayed frames, or other specified frames. Under the "insert" menu item $310_5$, the user may insert various features or text into a single or a plurality of frames. Under the "format" menu item $310_6$, the user may elect to edit and/or view a single or a plurality of video frames. The display page 300 also comprises a body 320 which displays a plurality of video frames $320_1$–$320_n$. In one embodiment, the body 320 includes two rows of five video frames. A vertical scrolling bar 330 facilitates vertical scrolling of the body 320 so that additional rows of the video frames $320_1$–$320_n$ may be displayed. A footer 340 includes a frame number section 350 and a horizontal scrolling bar 360. The frame number section 350 illustrates the frame numbers of the currently displayed video frames. The horizontal scrolling bar 360 facilitates the horizontal scrolling of the body 320 so that additional columns of video frames may be displayed.

Selection of the menu items $310_1$–$310_m$ may be accomplished using a mouse (not shown) or by depressing certain coded keys as determined by the programmer. In addition, scrolling through the use of the vertical scrolling bar 330 or the horizontal scrolling bar 360 may be performed through the use of a mouse and/or through the use of the arrow keys on a keyboard. The frame number section 350 will be updated upon scrolling of the body 320 either vertically or horizontally, so as to indicated the currently displayed video frames.

Figure 4:
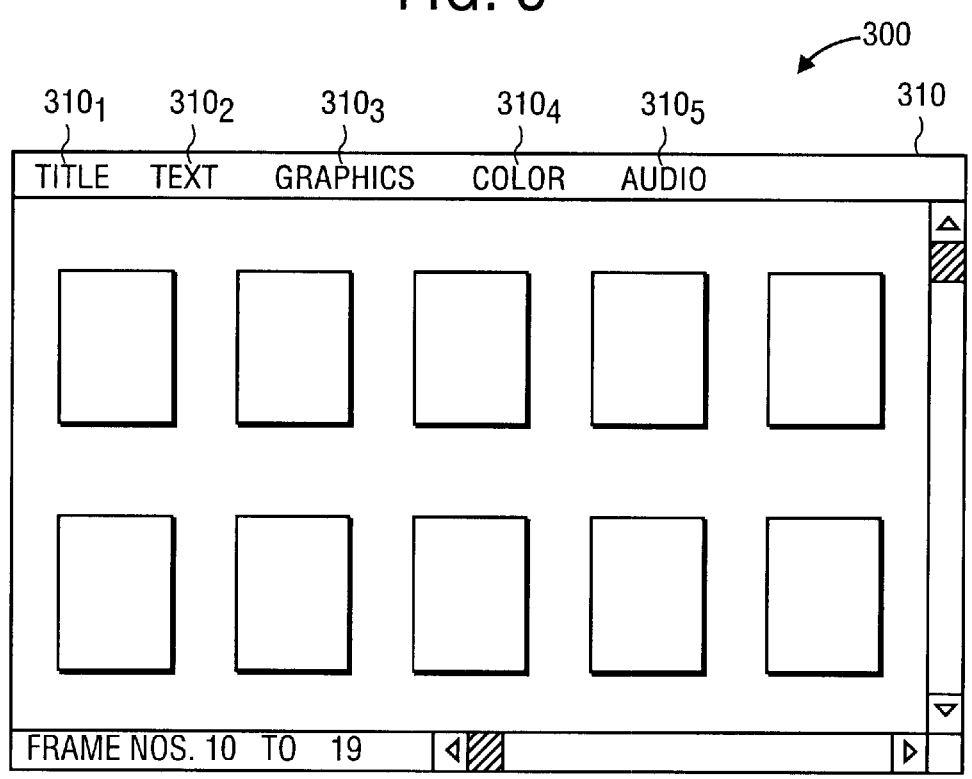
FIG. 4 illustrates one embodiment of a display page with sub menu items, provided for editing video frames, in accordance with the teachings of the present invention.
Figure 5:
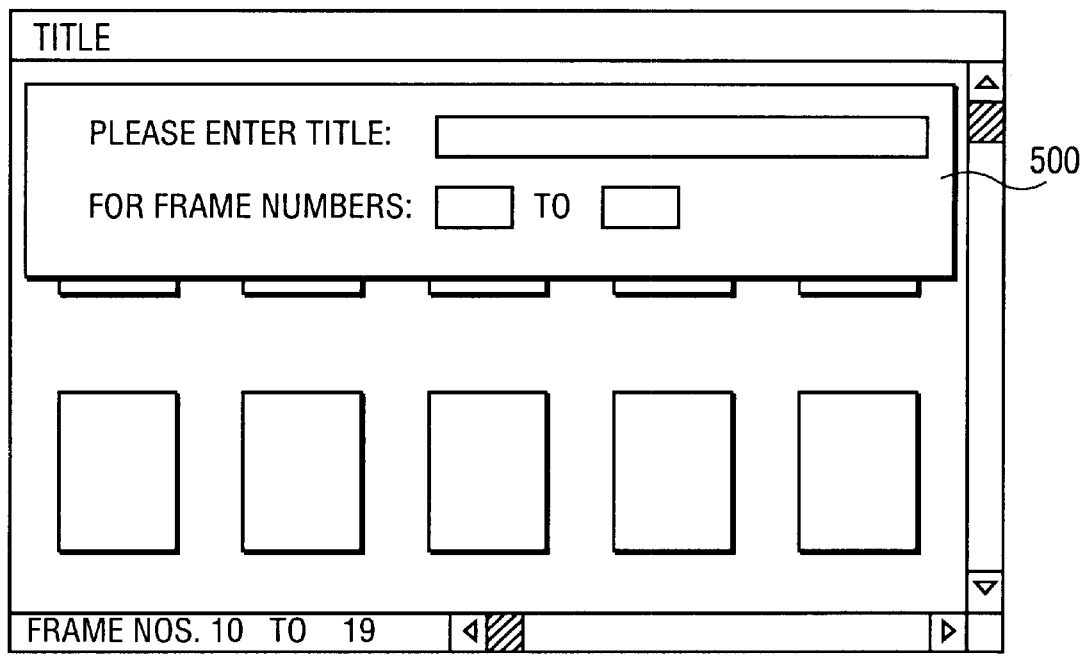
FIG. 5 illustrates one embodiment of a display page with a dialog box, provided for editing video frames, in accordance with the teachings of the present invention.

Upon selection of any one of the menu items $310_1$–$310_m$, such as file, save, edit, view, insert and/or format, additional sub-items are displayed in the header 310. For example, if the "edit" menu item $310_3$ is selected, the header 310 will be updated to display a plurality of sub items $370_1$–$370_k$ such as title, text, graphics, palette, and/or audio as shown in FIG. 4. The body 320 will continue to display the plurality of video frames $320_1$–$320_n$. Upon selection of one of the sub-items $370_1$–$370_k$, a dialog box 500 such as that shown in FIG. 5 will be displayed. In one embodiment, the dialog box 500 is overlaid on the body 320 of the display page 300. For example, if the "title" sub item $370_1$ (FIG. 4) was selected, a dialog box 500 which prompts the user to enter the title and the corresponding frame numbers (for which insertion of the title is required), is displayed. Upon entering the required information, the corresponding edits are performed.

Figure 6:
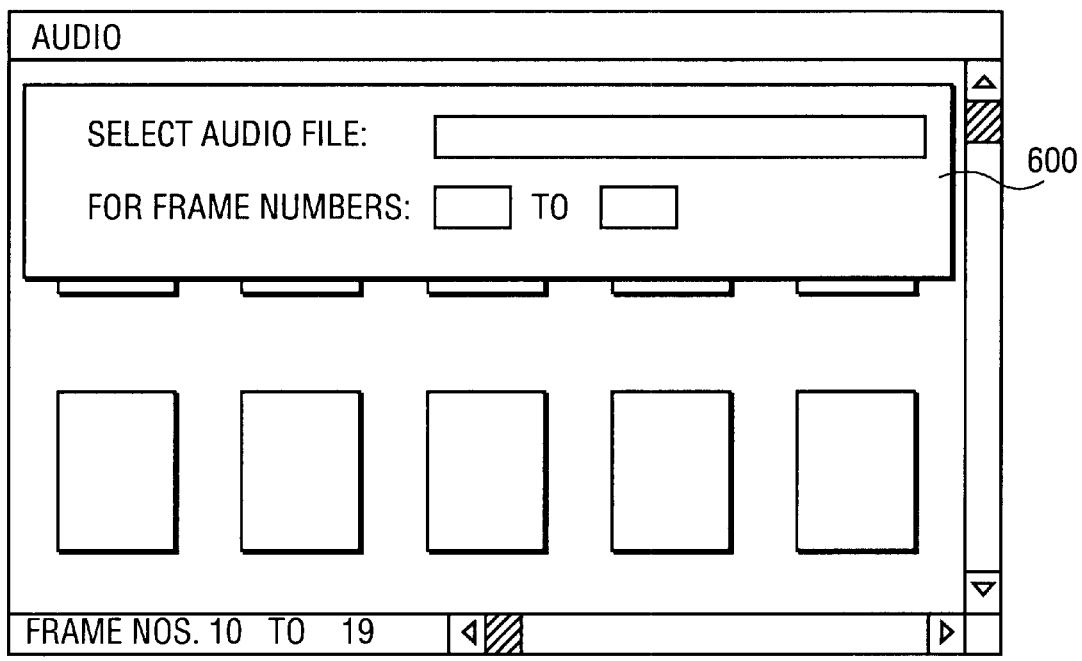
FIG. 6 illustrates a second embodiment of a display page with a dialog box, provided for editing video frames, in accordance with the teachings of the present invention.

In another example, if the "audio" sub item $370_5$ is selected, a dialog box 600 as shown in FIG. 6, which prompts the user to enter the audio file and the corresponding frame numbers (for which selection of the audio file is required), is displayed. Upon entering the required information, the corresponding audio file is synchronized for audio playback when the associated video frames are visually displayed.

Figure 7:
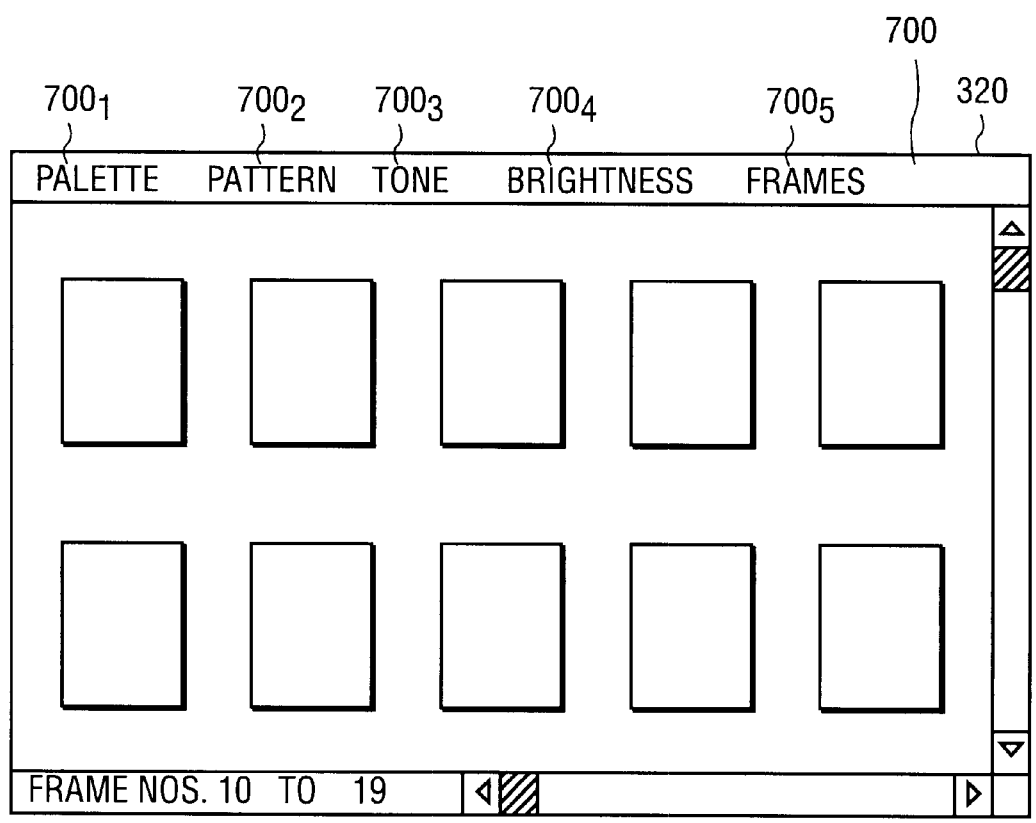
FIG. 7 illustrates one embodiment of a display page with palette sub menu items, provided for editing video frames, in accordance with the teachings of the present invention.

In a further example, if the "color" sub item $370_4$ (see FIG. 4) is selected, the header 310 is updated to display a further "color" submenu 700, as shown in FIG. 7. In one embodiment, the "color" submenu 700 comprises "color" sub menu items $700_1$–$700_j$, such as palette, pattern, tone, brightness and/or frames. Upon selection of any one of the "color" sub menu items $700_1$–$700_j$, a further sub menu may be displayed.

In another embodiment, a single video frame or portions thereof, may be edited, as shown in FIGS. 8A–F. Such a feature may be selected by choosing the "format" menu item $310_6$ as shown in FIG. 3, and specifying that editing of a single frame is desired. The edited single video frame may then be used as a bit map for other user-specified video frames for which editing is desired. In this embodiment, the display page 800 (see FIG. 8A) comprises a header or a banner 810 which displays a plurality of menu items 810$_1$–810$_m$, such as file, save, edit, view, insert and/or format. The display page 800 also comprises a body 820 which displays a single video frame. A vertical scrolling bar 830 facilitates vertical scrolling of the body 320. A footer 840 includes a frame number section 350 and a horizontal scrolling bar 360. The frame number section 850 illustrates the frame number of the currently displayed video frame. The horizontal scrolling bar 860 facilitates the horizontal scrolling of the body 820.

Selection of the menu items 810$_1$–810$_m$ may be accomplished using a mouse (not shown) or by depressing certain coded keys as determined by the programmer. In addition, scrolling through the use of the vertical scrolling bar 830 or the horizontal scrolling bar 860 may be performed through the use of a mouse and/or through the use of the arrow keys on a keyboard. The frame number section 850 will be updated upon scrolling of the body 820 either vertically or horizontally, so as to indicated the currently displayed video frames.

Figure 8A:
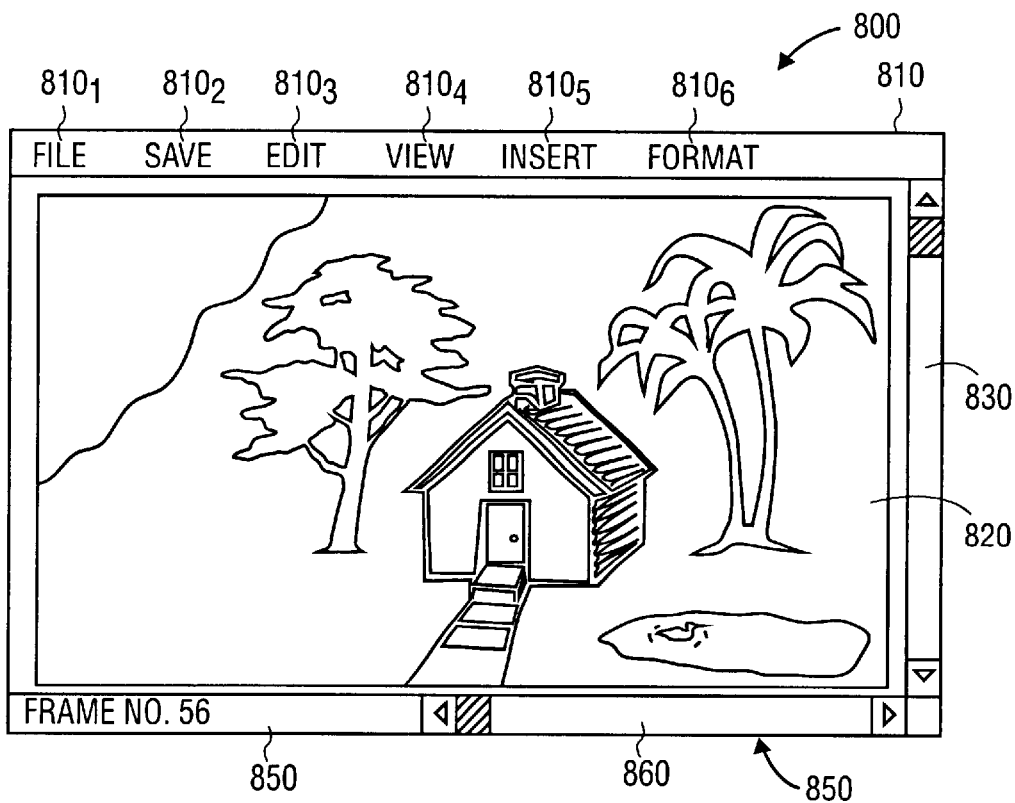
FIG. 8A illustrates one embodiment of a display page with a single video frame.
Figure 8B:
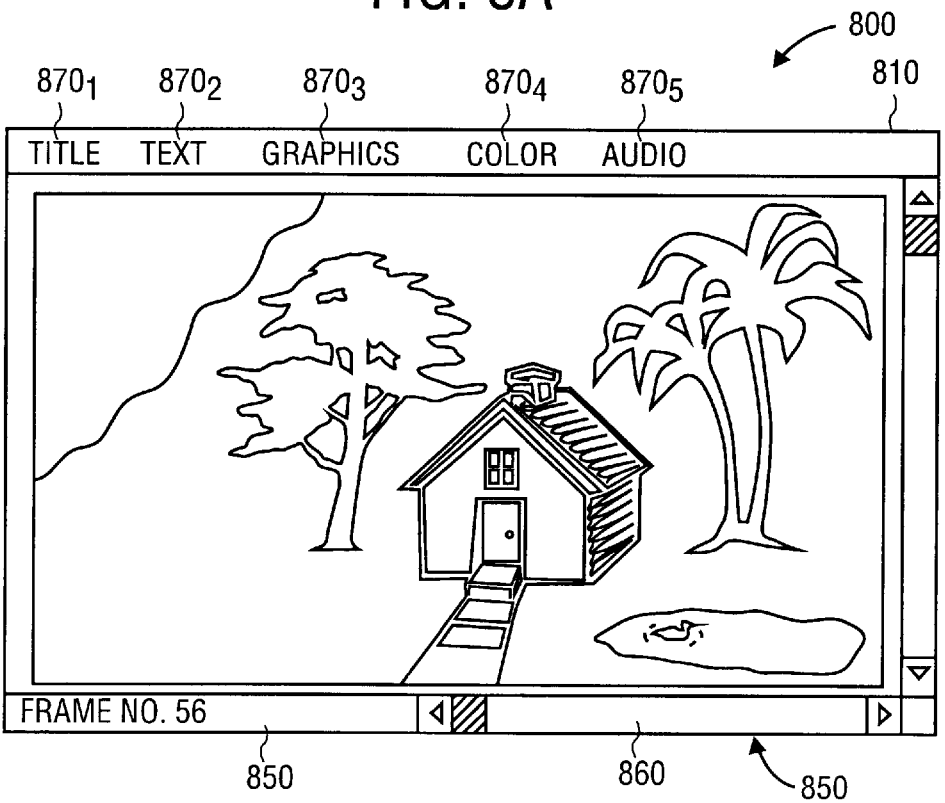
FIG. 8B illustrates one embodiment of a display page with "edit" submenu items, provided for editing a single video frame, in accordance with the teachings of the present invention.

Upon selection of any one of the menu items 810$_1$–810$_m$, such as file, save, edit, view, insert and/or format, additional sub-items are displayed in the header 810. For example, if the "edit" menu item 810$_3$ is selected, the header 810 will be updated to display a plurality of sub items 870$_1$–870$_k$ such as title, text, graphics, palette, and/or audio as shown in FIG. 8B. The body 820 will continue to display the single video frame. Operation for the various menu and sub-menu items in the single video frame format is the same as that in the multiple video frame format described above.

Figure 8C:
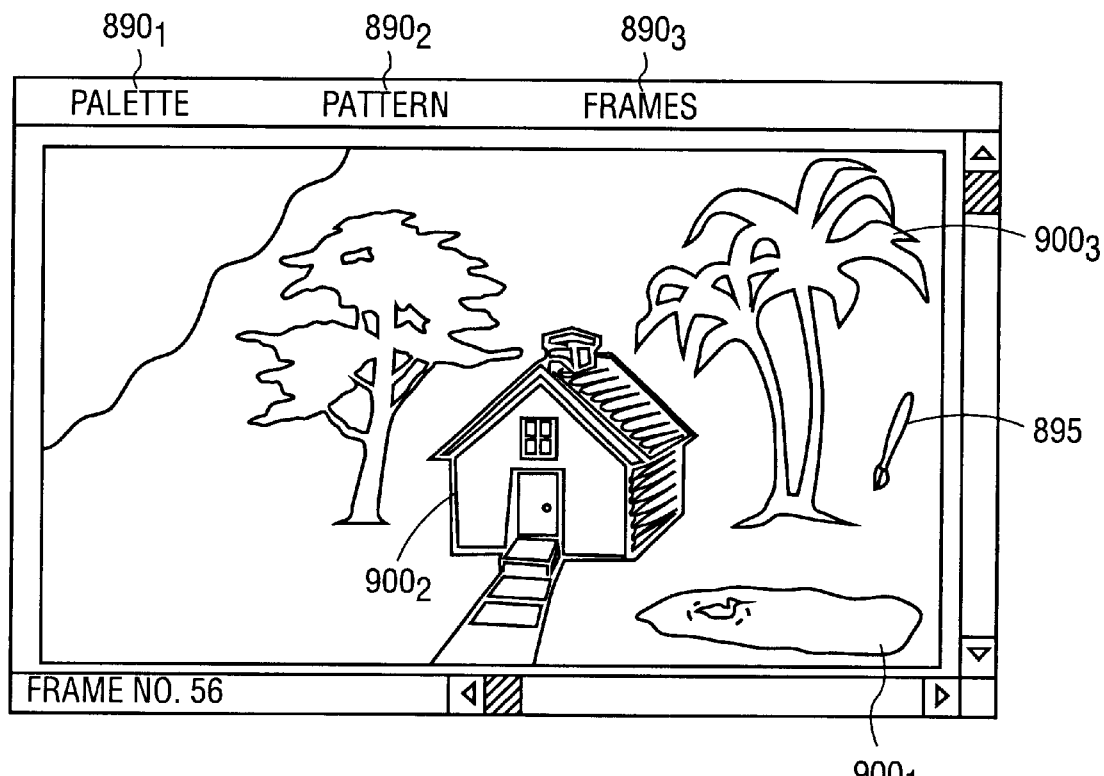
FIG. 8C illustrates one embodiment of a display page with "color" submenu items, provided for editing a single video frame, in accordance with the teachings of the present invention.
Figure 8D:
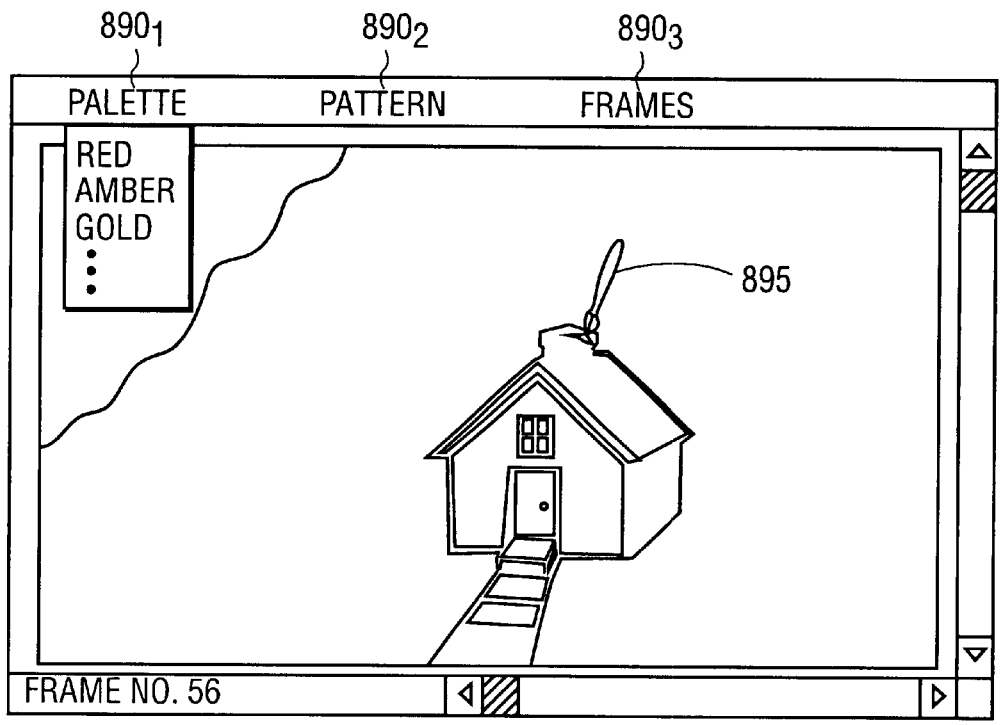
FIG. 8D illustrates one embodiment of a display page with "palette" submenu items, provided for editing a single video frame, in accordance with the teachings of the present invention.

Although the color selection process as provided by selecting the "color" submenu item 370$_4$ (FIG. 4) or 870$_4$ (FIG. 8B) may be performed for either a multiple frame format (FIG. 4) or a single frame format (FIG. 8B), for viewing purposes, it is easier to perform this task using a single frame. Thus while the following description is applicable for operations in either formats, for present purposes, the color selection process will be described with reference to a single frame format. Upon selection of one of the "color" sub-item 870$_4$ (as shown in FIG. 8B), the header 810 is updated to display a "palette" submenu item 890$_1$, a "pattern" submenu item 890$_2$ and a "frames" submenu item 890$_3$, as shown in FIG. 8C. In addition, a paintbrush 895 appears on the body 820 of the display page 800. The user may move the paintbrush using a mouse (not shown) to any enclosed region of the video frame, for example, regions 900$_1$, 900$_2$ or 900$_3$.

If the user desires to alter the color of a selected region, for example, region 900$_2$, he may click on a button of the mouse (to select the region of interest) and then move the paintbrush up to the header 810, whereupon the paintbrush will be replaced by an arrow for selection of any one of the submenu items 890$_1$, 890$_2$ or 890$_3$. To alter or to add a color to the selected region 900$_2$, the user may point the arrow at the "palette" submenu item 890$_1$ and depress (and continue to hold down) the button on the mouse, whereupon a series of submenu items representing a selection of colors, is displayed (see FIG. 8D). The desired color may thus be selected by moving to the desired palette and then releasing the button on the mouse.

Figure 8E:
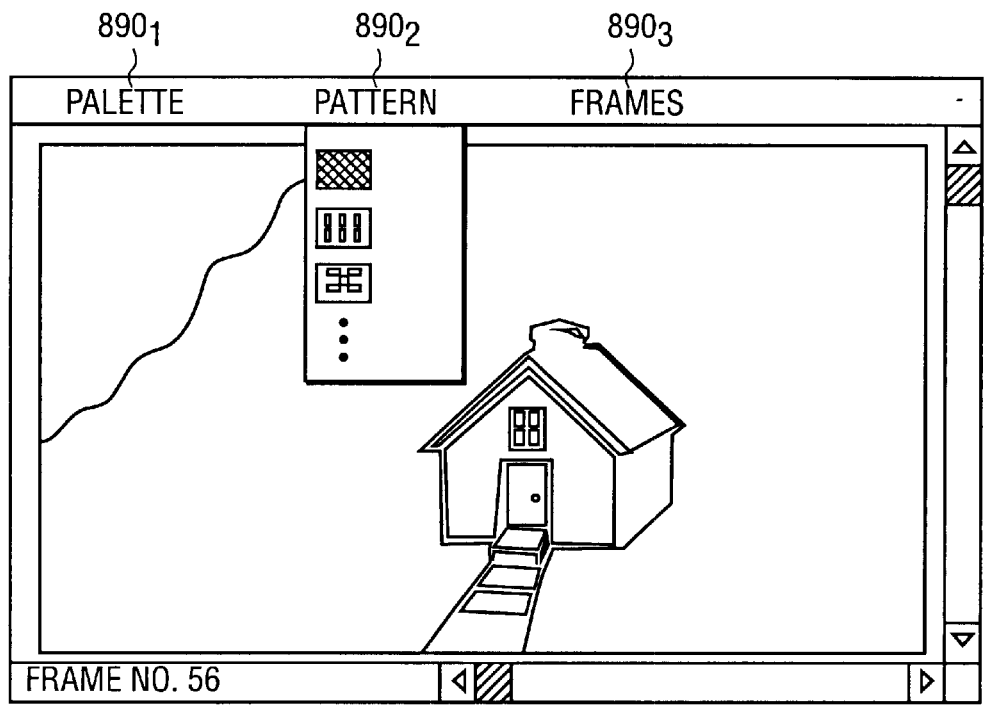
FIG. 8E illustrates one embodiment of a display page with "pattern" submenu items, provided for editing a single video frame, in accordance with the teachings of the present invention.
Figure 8F:
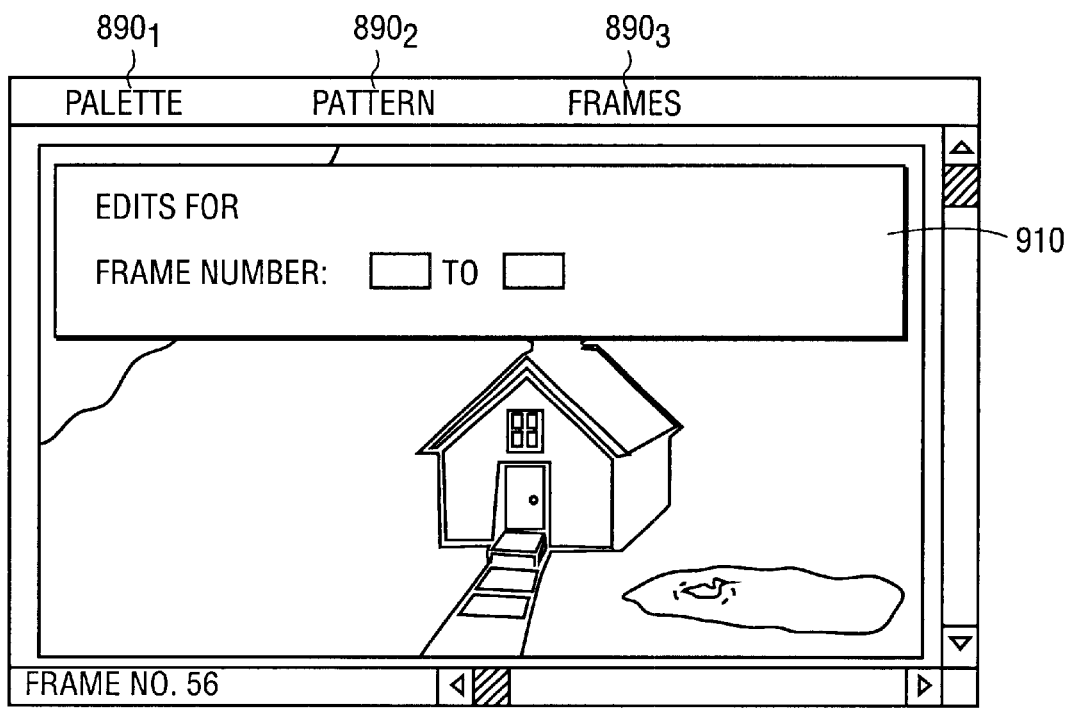
FIG. 8F illustrates one embodiment of a display page with a dialog box, provided for editing a plurality of selected video frames based on a single edited video frame, in accordance with the teachings of the present invention.

To alter or to add a pattern to a selected region, the user may point the arrow at the "pattern" submenu item 890$_2$, the user may depress (and continue to hold down) the button on the mouse, whereupon a series of submenu items representing a selection of patterns, is displayed (see FIG. 8E). The desired pattern may then be selected by moving to the desired pattern and then releasing the button on the mouse. Once color editing is complete, the user may select the "frames" submenu item 890$_3$, whereupon a dialog box 910 is displayed to facilitate color editing for the specified number of frames based on the single frame that had been previously edited. Thus, the single video frame is processed as a bitmap to overlay appropriate grids forming the specified video frames.

The present invention thus provides a video editor for video frames stored on a digital video disk, that is simple and convenient to use and which provides editing without degrading image quality.

The present invention described herein may be designed in many different embodiments and using many different configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. An apparatus comprising:
    a memory to store instruction sequences;
    a digital video disk to store at least one video frame; and
    a processor to execute the instruction sequences;
    wherein the instruction sequences cause the processor to retrieve the at least one video frame from the digital video disk, receive an instruction from a user interface to select an adjustment parameter of the at least one video frame, edit the at least one video frame in accordance with the selected adjustment parameter and process a bitmap representative of the edit;
    wherein the bitmap can overlay a further video frame to edit the further video frame in accordance with the selected adjustment parameter.

2. The apparatus of claim 1, wherein the digital video disk is configured to store a second video frame, and wherein the stored instruction sequences cause the processor to receive a second instruction to process the second video frame in accordance with the instruction to select the adjustment parameter.

3. The apparatus of claim 1, wherein the digital video disk is configured to store a plurality of video frames, and wherein the stored instruction sequences cause the processor to receive a second instruction to process a selected number of video frames in the plurality of video frames, in accordance with the instruction to select the adjustment parameter.

4. The apparatus of claim 1, wherein the stored instruction sequences cause the processor to store the processed video frame on the digital video disk.

5. The apparatus of claim 1, further comprising a display screen coupled to said processor; wherein the stored instruction sequences cause the processor to display the processed at least one video frame.

6. The apparatus of claim 4, wherein the adjustment parameter is a color.

7. The apparatus of claim 1, wherein the adjustment parameter is textual information.

8. The apparatus of claim 1, wherein the adjustment parameter is the inclusion of audio information corresponding to the at least one video frame.

9. The apparatus of claim 1, wherein receiving comprises the steps of:

receiving a first instruction to select a portion of the at least one video frame;

receiving a second instruction to select an adjustment parameter of the at least one video frame; and wherein processing comprises the step of processing the selected portion of the at least one video frame with said second instruction.

10. The apparatus of claim 9, further comprising a software tool to create graphics controlled by a mouse to select the portion.

11. A method comprising:

providing a digital video disk configured to store at least one video frame;

retrieving the at least one video frame;

receiving an instruction to select an adjustment parameter of the at least one video frame;

editing the at least one video frame in accordance with the selected adjustment parameter; and processing a bitmap representative of the edit;

wherein the bitmap can overlay a further video frame to edit the further video frame in accordance with the selected adjustment parameter.

12. The method of claim 11, wherein the digital video disk is configured to store a second video frame, the method further comprising receiving a second instruction to process the second video frame.

13. The method of claim 11, wherein the digital video disk is configured to store a plurality of video frames, the method further comprising receiving a second instruction to process a selected number of video frames in the plurality of video frames.

14. The method of claim 11, further comprising storing the processed video frame on the digital video disk.

15. The method of claim 11, further comprising displaying the processed at least one video frame.

16. The method of claim 14, wherein the adjustment parameter is color.

17. The method of claim 14, wherein the adjustment parameter is the addition of textual information.

18. The method of claim 11, wherein the adjustment parameter is the inclusion of audio information corresponding to the at least one video frame.

19. The method of claim 11, wherein receiving an instruction to select an adjustment parameter of the at least one video frame comprises:

receiving a first instruction to select a portion of the at least one video frame;

receiving a second instruction to select an adjustment parameter of the at least one video frame; and wherein editing comprises the step of processing the selected portion of the at least one video frame with said second instruction.

20. The method of claim 19, further including selecting the portion by using a software tool to create graphics controlled by a mouse.

21. A machine-readable medium having stored thereon instructions which, when executed by a set of processors, cause the set of processors to:

retrieve at least one video frame from video stored on a digital video disk configured to store the at least one video frame;

receive an instruction from a user interface to select an adjustment parameter of the at least one video frame;

edit the at least one video frame in accordance with the selected adjustment parameter; and process a bitmap representative of the edit;

wherein the bitmap can overlay a further video frame to edit the further video frame in accordance with the selected adjustment parameter.

* * * * *